United States Patent
Belin et al.

(10) Patent No.: US 11,230,636 B2
(45) Date of Patent: Jan. 25, 2022

(54) RUBBER COMPOSITION HAVING IMPROVED PROPERTIES IN THE RAW STATE AND IN THE COOKED STATE

(71) Applicant: COMPAGNIE GENERALE DES ETABLISSEMENTS MICHELIN, Clermont-Ferrand (FR)

(72) Inventors: Lionel Belin, Clermont-Ferrand (FR); Claire Dalliere, Clermont-Ferrand (FR); Eve-Anne Filiol, Clermont-Ferrand (FR); Eric Jordery, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 328 days.

(21) Appl. No.: 16/487,151

(22) PCT Filed: Feb. 14, 2018

(86) PCT No.: PCT/FR2018/050356
§ 371 (c)(1),
(2) Date: Aug. 20, 2019

(87) PCT Pub. No.: WO2018/150136
PCT Pub. Date: Aug. 23, 2018

(65) Prior Publication Data
US 2020/0056017 A1    Feb. 20, 2020

(30) Foreign Application Priority Data

Feb. 20, 2017 (FR) ........................ 1751327

(51) Int. Cl.
| | |
|---|---|
| *C08L 9/06* | (2006.01) |
| *B60C 1/00* | (2006.01) |
| *C08K 3/04* | (2006.01) |
| *C08K 3/06* | (2006.01) |
| *C08K 5/00* | (2006.01) |
| *C08K 5/14* | (2006.01) |
| *C08K 5/3415* | (2006.01) |
| *C08K 5/41* | (2006.01) |
| *C08L 7/00* | (2006.01) |

(52) U.S. Cl.
CPC ........ *C08L 9/06* (2013.01); *B60C 1/00* (2013.01); *C08K 3/04* (2013.01); *C08K 3/06* (2013.01); *C08K 5/0025* (2013.01); *C08K 5/14* (2013.01); *C08K 5/3415* (2013.01); *C08K 5/41* (2013.01); *C08L 7/00* (2013.01); *C08K 2201/006* (2013.01); *C08L 2207/04* (2013.01)

(58) Field of Classification Search
CPC ..... C08L 9/06; C08L 7/00; B60C 1/00; C08K 3/04; C08K 2201/006
USPC ........................................ 523/156
See application file for complete search history.

(56) References Cited

U.S. PATENT DOCUMENTS

| | | |
|---|---|---|
| 5,227,425 A | 7/1993 | Rauline |
| 5,852,099 A | 12/1998 | Vanel |
| 5,900,449 A | 5/1999 | Custodero et al. |
| 5,977,238 A | 11/1999 | Labauze |
| 6,013,718 A | 1/2000 | Cabioch et al. |
| 6,420,488 B1 | 7/2002 | Penot |
| 6,503,973 B2 | 1/2003 | Robert et al. |
| 6,536,492 B2 | 3/2003 | Vasseur |
| 6,815,473 B2 | 11/2004 | Robert et al. |
| 6,880,600 B1 | 4/2005 | Bidet |
| 7,128,112 B2 | 10/2006 | Prost et al. |
| 7,199,175 B2 | 4/2007 | Vasseur |
| 7,250,463 B2 | 7/2007 | Durel et al. |
| 7,312,264 B2 | 12/2007 | Gandon-Pain |
| 7,358,313 B2 | 4/2008 | Blanchard et al. |

(Continued)

FOREIGN PATENT DOCUMENTS

| | | |
|---|---|---|
| EP | 0501227 A1 | 9/1992 |
| EP | 0735088 A1 | 10/1996 |

(Continued)

OTHER PUBLICATIONS

F. Vilmin, et al., "Fast and Robust Method for the Determination of Microstructure and Composition in Butadiene, Styrene-Butadiene, and Isoprene Rubber by Near-Infrared Spectroscopy", Appl. Spectroscopy, vol. 60, No. 6, pp. 619-630 (2006).

(Continued)

*Primary Examiner* — Doris L Lee
(74) *Attorney, Agent, or Firm* — Venable LLP

(57) ABSTRACT

A rubber composition is based on at least an elastomeric matrix comprising at most 70 parts by weight, per hundred parts by weight of elastomer, phr, of a polyisoprene and at least 30 phr of a butadiene/styrene copolymer, the butadiene/styrene copolymer exhibiting a content of styrene units of between 20% and 40% by weight, with respect to the total weight of the butadiene/styrene copolymer, a content of trans-1,4-butadiene unit of greater than 65% by weight, with respect to the total weight of the butadiene units, a content of vinyl unit of less than 8% by weight, with respect to the total weight of the butadiene units, and a glass transition temperature of between −60° C. and −35° C.; from 35 to 75 phr of a carbon black exhibiting a BET specific surface of between 90 and 100 $m^2/g$ and a COAN absorption index of between 90 and 100 ml/100 g; and a crosslinking system.

26 Claims, No Drawings

(56) References Cited

U.S. PATENT DOCUMENTS

| | | |
|---|---|---|
| 7,825,183 B2 | 11/2010 | Robert et al. |
| 7,834,074 B2 | 11/2010 | Brunelet et al. |
| 7,882,874 B2 | 2/2011 | Robert et al. |
| 7,900,667 B2 | 3/2011 | Vasseur |
| 8,324,310 B2 | 12/2012 | Robert et al. |
| 8,344,063 B2 | 1/2013 | Marechal et al. |
| 8,455,584 B2 | 6/2013 | Robert et al. |
| 8,492,479 B2 | 7/2013 | Robert et al. |
| 2001/0034389 A1 | 10/2001 | Vasseur |
| 2001/0036991 A1 | 11/2001 | Robert et al. |
| 2002/0049294 A1* | 4/2002 | Shiina ............... C08K 5/25 526/329.2 |
| 2002/0183436 A1 | 12/2002 | Robert et al. |
| 2003/0212185 A1 | 11/2003 | Vasseur |
| 2005/0004297 A1 | 1/2005 | Durel et al. |
| 2005/0183809 A1 | 8/2005 | Prost et al. |
| 2005/0187340 A1 | 8/2005 | Blanchard et al. |
| 2006/0089445 A1 | 4/2006 | Gandon-Pain |
| 2007/0112120 A1 | 5/2007 | Vasseur |
| 2008/0009564 A1 | 1/2008 | Robert et al. |
| 2008/0156404 A1 | 7/2008 | Brunelet et al. |
| 2009/0292063 A1 | 11/2009 | Robert et al. |
| 2010/0184912 A1 | 7/2010 | Marechal et al. |
| 2010/0204359 A1 | 8/2010 | Robert et al. |
| 2010/0249270 A1 | 9/2010 | Robert et al. |
| 2010/0252156 A1 | 10/2010 | Robert et al. |
| 2011/0030871 A1 | 2/2011 | Bestgen et al. |
| 2013/0030097 A1* | 1/2013 | Salgues ............... B60C 1/0016 524/186 |
| 2013/0146198 A1 | 6/2013 | Chang et al. |
| 2015/0246581 A1* | 9/2015 | Salgues ............... B60C 15/00 524/575 |

FOREIGN PATENT DOCUMENTS

| | | |
|---|---|---|
| EP | 0810258 A1 | 12/1997 |
| EP | 0823453 A1 | 2/1998 |
| EP | 1 074 403 A1 | 2/2001 |
| EP | 1127909 A1 | 8/2001 |
| FR | 2740778 A1 | 5/1997 |
| FR | 2765882 A1 | 1/1999 |
| FR | 2924979 A1 | 6/2009 |
| WO | 97/36724 A2 | 10/1997 |
| WO | 99/16600 A1 | 4/1999 |
| WO | 00/05300 A1 | 2/2000 |
| WO | 00/05301 A1 | 2/2000 |
| WO | 01/92402 A1 | 12/2001 |
| WO | 02/10269 A2 | 2/2002 |
| WO | 03/016387 A1 | 2/2003 |
| WO | 03/106195 A1 | 12/2003 |
| WO | 2004/018236 A1 | 3/2004 |
| WO | 2004/096865 A1 | 11/2004 |
| WO | 2005/087859 A1 | 9/2005 |
| WO | 2006/061064 A1 | 6/2006 |
| WO | 2007/017060 A1 | 2/2007 |
| WO | 2008/141702 A1 | 11/2008 |
| WO | 2009/000750 A1 | 12/2008 |
| WO | 2009/000752 A1 | 12/2008 |
| WO | 2011/147710 A1 | 12/2011 |

OTHER PUBLICATIONS

International Search Report dated May 23, 2018, in corresponding PCT/FR2018/050356 (4 pages).

* cited by examiner

RUBBER COMPOSITION HAVING IMPROVED PROPERTIES IN THE RAW STATE AND IN THE COOKED STATE

BACKGROUND

The present invention relates to rubber compositions intended in particular for the manufacture of tyres or of finished and semi-finished products for tyres.

Since the need to protect the environment has become a priority, it is desirable to reduce the amount of material used within a tyre, for example by reducing the amount of materials of the finished and semi-finished products of which it is composed. However, this reduction in material must not under any circumstances damage the properties of the tyre.

Solutions in this sense have been provided, for example by modifying the profiles of tyres, or else by modifying the combinations or the arrangements of finished or semi-finished products within the tyre (WO 2004/018236, FR 2 924 979).

In point of fact, it still remains advantageous to further reduce the amount of material within a tyre while retaining its properties.

The Applicant Company has discovered that it is possible to meet this need by using specific rubber compositions. In particular, the Applicant Company has reported that it is possible to reduce the thicknesses of the finished or semi-finished products for tyres by virtue of compositions exhibiting improved mechanical properties, both in the raw state, in order to be able to produce the semi-finished products under satisfactory industrial conditions, and in the cured state, in order to retain the overall properties of the finished or semi-finished product and more generally those of the tyre.

SUMMARY

Thus, a subject-matter of the present invention is in particular a rubber composition based on at least:
an elastomeric matrix comprising at most 70 phr of a polyisoprene and at least 30 phr of a butadiene/styrene copolymer,
the butadiene/styrene copolymer exhibiting a content of styrene units of between 20% and 40% by weight, with respect to the total weight of the butadiene/styrene copolymer, a content of trans-1,4-butadiene units of greater than 65% by weight, with respect to the total weight of the butadiene units, a content of vinyl units of less than 8% by weight, with respect to the total weight of the butadiene units, and a glass transition temperature of between −60° C. and −35° C.,
from 35 to 75 phr of a carbon black exhibiting a BET specific surface of between 90 and 100 m²/g and a COAN absorption index of between 90 and 100 ml/100 g,
a crosslinking system.

Another subject-matter of the present invention is a finished or semi-finished rubber article comprising a rubber composition according to the invention, and also a tyre comprising at least one finished or semi-finished article according to the invention, or at least one composition according to the invention.

I—DEFINITIONS

The expression "part by weight per hundred parts by weight of elastomer" (or phr) should be understood as meaning, within the meaning of the present invention, the part by weight per hundred parts by weight of elastomer or rubber.

In the present document, unless expressly indicated otherwise, all the percentages (%) shown are percentages (%) by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b). In the present document, when an interval of values is denoted by the expression "from a to b", the interval represented by the expression "between a and b" is also and preferably denoted.

In the present document, the expression composition "based on" is understood to mean a composition comprising the mixture and/or the reaction product of the various constituents used, some of these base constituents being capable of reacting or intended to react with one another, at least in part, during the various phases of manufacture of the composition, in particular during the crosslinking or vulcanization thereof. By way of example, a composition based on an elastomeric matrix and on sulfur comprises the elastomeric matrix and the sulfur before curing, whereas, after curing, the sulfur is no longer detectable as the latter has reacted with the elastomeric matrix with the formation of sulfur (polysulfide, disulfide, monosulfide) bridges.

When reference is made to a "predominant" compound, this is understood to mean, within the meaning of the present invention, that this compound is predominant among the compounds of the same type in the composition, that is to say that it is the one which represents the greatest amount by weight among the compounds of the same type, for example more than 50%, 60%, 70%, 80%, 90%, indeed even 100%, by weight, with respect to the total weight of the compound type. Thus, for example, a predominant reinforcing filler is the reinforcing filler representing the greatest weight with respect to the total weight of the reinforcing fillers in the composition. On the contrary, a "minor" compound is a compound which does not represent the greatest fraction by weight among the compounds of the same type, for example less than 50%, 40%, 30%, 20%, 10%, indeed even less.

Within the context of the invention, the carbon products mentioned in the description may be of fossil or biosourced origin. In the latter case, they may partially or completely result from biomass or be obtained from renewable starting materials resulting from biomass. Polymers, plasticizers, fillers, and the like, are concerned in particular.

II—DESCRIPTION OF THE INVENTION

II-1 Elastomeric Matrix

It should be remembered here that elastomer (or "rubber", the two terms being regarded as synonymous) of the "diene" type should be understood, in a known way, to mean an (one or more is understood) elastomer resulting at least in part (i.e., a homopolymer or a copolymer) from diene monomers (monomers bearing two conjugated or non-conjugated carbon-carbon double bonds).

Generally, the diene elastomers can be classified into two categories: "essentially unsaturated" or "essentially saturated". "Essentially unsaturated" is understood to mean generally a diene elastomer resulting at least in part from conjugated diene monomers having a content of units or units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Given these definitions, diene elastomer capable of being used in the compositions in accordance with the invention is understood more particularly to mean:
 a) any homopolymer obtained by polymerization of a conjugated diene monomer having from 4 to 12 carbon atoms;
 b) any copolymer obtained by copolymerization of one or more conjugated dienes with one another or with one or more vinylaromatic compounds having from 8 to 20 carbon atoms;
 c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
 d) a copolymer of isobutene and of isoprene (butyl rubber) and also the halogenated versions, in particular chlorinated or brominated versions, of this type of copolymer.

A person skilled in the art of tyres will understand that the present invention is employed with essentially unsaturated diene elastomers, in particular of the type (a) or (b) above.

The following are suitable in particular as conjugated dienes: 1,3-butadiene, 2-methyl-1,3-butadiene, alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 20% and 99% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or aminated functional groups, such as aminobenzophenone, for example; mention may be made, for example, for coupling to a reinforcing inorganic filler, such as silica, of silanol or polysiloxane functional groups having a silanol end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

According to the invention, the elastomeric matrix comprises at most 70 phr of a polyisoprene and at least 30 phr of a butadiene/styrene copolymer, the butadiene/styrene copolymer exhibiting a content of styrene units of between 20% and 40% by weight, with respect to the total weight of the butadiene/styrene copolymer, a content of trans-1,4-butadiene units of greater than 65% by weight, with respect to the total weight of the butadiene units, a content of vinyl units of less than 8% by weight, with respect to the total weight of the butadiene units, and a glass transition temperature of between −60° C. and −35° C.

The glass transition temperature Tg is measured in a known way by DSC (Differential Scanning calorimetry) according to Standard ASTM D3418 (1999).

"Polyisoprene" is understood to mean, in a known way, an isoprene homopolymer or copolymer, in other words a diene elastomer selected from the group consisting of natural rubber (NR), which may be plasticized or peptized, synthetic polyisoprenes (IRs), the various isoprene copolymers and the mixtures of these elastomers. Mention will in particular be made, among isoprene copolymers, of isobutene/isoprene (butyl rubber IIR), isoprene/styrene (SIR), isoprene/butadiene (BIR) or isoprene/butadiene/styrene (SBIR) copolymers. Preferably, the polyisoprene is selected from the group consisting of natural rubber, a synthetic polyisoprene and one of their mixtures; more preferably, the polyisoprene predominantly and more advantageously still exclusively comprises natural rubber.

Preferably, the polyisoprene comprises a content by weight of cis-1,4 bonds of at least 90%, more preferably of at least 98%, with respect to the weight of the polyisoprene.

According to the invention, the butadiene/styrene copolymer advantageously exhibits any one, preferably two, more preferably three and more preferentially all of the following characteristics:
 a content of styrene units of between 20% and 30% by weight, with respect to the total weight of the butadiene/styrene copolymer,
 a content of trans-1,4-butadiene units of between 65% and 90%, preferably between 70% and 90%, by weight, with respect to the total weight of the butadiene units,
 a content of vinyl units of between 2% and 8% by weight, with respect to the total weight of the butadiene units,
 a glass transition temperature of between −60° C. and −40° C.

According to the invention, whatever the nature of the butadiene/styrene copolymer according to the invention, it is advantageously a butadiene/styrene copolymer prepared in solution ("SSBR").

Advantageously, the elastomeric matrix comprises from 30 to 70 phr of the polyisoprene and from 30 to 70 phr of the butadiene/styrene copolymer. Preferably again, the elastomeric matrix comprises from 30 to 60 phr of the polyisoprene and from 40 to 70 phr of the butadiene/styrene copolymer. More preferably still, the elastomeric matrix comprises from 30 to 50 phr of the polyisoprene and from 50 to 70 phr of the butadiene/styrene copolymer.

Although this is not necessary for the implementation of the present invention, the elastomeric matrix of the composition according to the invention can contain in a minor way one or more diene elastomers (hereinafter known as "other diene elastomer", for the sake of simplicity of wording) different from the polyisoprene and the butadiene/styrene copolymer which are used in the context of the present invention. For example, the other diene elastomer can be chosen, for example, from the group of highly unsaturated diene elastomers consisting of polybutadienes (abbreviated to "BRs"), butadiene copolymers, isoprene copolymers and the mixtures of these elastomers. Such copolymers can, for example, be selected from the group consisting of butadiene/styrene copolymers (SBRs) different from the butadiene/styrene copolymer used in the context of the present invention, isoprene/butadiene copolymers (BIRs), isoprene/styrene copolymers (SIRs), isoprene/butadiene/styrene copolymers (SBIRs), butadiene/acrylonitrile copolymers (NBRs), butadiene/styrene/acrylonitrile copolymers (NSBRs) or a mixture of two or more of these compounds. Preferably, the elastomeric matrix does not contain other diene elastomer or contains less than 20 phr, preferably less than 10 phr, more preferably less than 5 phr, thereof.

The elastomeric matrix can also contain in a minor way any type of synthetic elastomer other than a diene elastomer, even polymers other than elastomers, for example thermoplastic polymers. Preferably, the elastomeric matrix does not contain a synthetic elastomer other than a diene elastomer or a polymer other than elastomers or contains less than 10 phr, preferably less than 5 phr, thereof.

II-2 Reinforcing Filler

The rubber composition comprises from 35 to 75 phr of a carbon black exhibiting a BET specific surface of between 90 and 100 m$^2$/g and a COAN absorption index of between 90 and 100 ml/100 g.

Such a reinforcing filler typically consists of particles, the (weight-)average size of which is less than a micrometre, generally less than 500 nm, most often of between 20 and 200 nm, in particular and more preferably of between 20 and 150 nm.

The BET specific surface of the carbon blacks is measured according to Standard D6556-10 [multipoint (a minimum of 5 points) method—gas: nitrogen—relative pressure $p/p_o$ range: 0.1 to 0.3].

The COAN, or Compressed Oil Absorption Number, of the carbon blacks is measured according to Standard ASTM D3493-16.

Preferably, the content of the carbon black is within a range extending from 40 to 70 phr, preferably from 45 to 65 phr and more preferably from 50 to 65 phr.

Although this is not necessary for the implementation of the present invention, the rubber composition according to the invention can contain in a minor way one or more reinforcing fillers different from the carbon black specifically necessary for the invention (that is to say, a reinforcing filler other than the carbon black exhibiting a BET specific surface of between 90 and 100 m$^2$/g and a COAN absorption index of between 90 and 100 ml/100 g). This or these different reinforcing fillers are known below as "other reinforcing filler" for the sake of simplicity of wording. The other reinforcing filler can, for example, comprise a carbon black different from the carbon black used in the context of the present invention, an organic filler other than carbon black, an inorganic filler or the mixture of at least two of these fillers. Mention may be made, as example of carbon black different from the carbon black used in the context of the present invention, of the reinforcing carbon backs of the 100 or 200 series, or the blacks of the 500, 600 or 700 series (ASTM grades), such as, for example, the N115, N134, N234, N550, N683 or N772 blacks.

The carbon blacks can be used in the isolated state, as available commercially, or in any other form, for example as support for some of the rubber additives used. The carbon blacks might, for example, be already incorporated in the diene elastomer, in particular isoprene elastomer, in the form of a masterbatch (see, for example, Applications WO 97/36724 and WO 99/16600).

The term "reinforcing inorganic filler" should be understood here as meaning any inorganic or mineral filler, whatever its colour and its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of pneumatic tyres, in other words capable of replacing, in its reinforcing role, a conventional tyre-grade carbon black; such a filler is generally characterized, in a known way, by the presence of hydroxyl (—OH) groups at its surface. In other words, without a coupling agent, the inorganic filler does not make it possible to reinforce, or to sufficiently reinforce, the composition and consequently does not come within the definition of "reinforcing inorganic filler".

Mineral fillers of the siliceous type, preferably silica (SiO$_2$), are suitable in particular as reinforcing inorganic fillers. The silica used can be any reinforcing silica known to a person skilled in the art, in particular any precipitated or fumed silica exhibiting a BET specific surface and also a CTAB specific surface both of less than 450 m$^2$/g, preferably from 30 to 400 m$^2$/g, in particular between 60 and 300 m$^2$/g. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/016387.

Preferably, the composition according to the invention does not contain an other reinforcing filler or contains less than 20 phr, preferably less than 10 phr, more preferably less than 5 phr, thereof.

II-3 Crosslinking System

The crosslinking system can be based on molecular sulfur and/or on sulfur donors and/or on peroxide, which are well known to a person skilled in the art.

Among the peroxides, which are well known to a person skilled in the art, it is preferable to use, for the invention, a peroxide chosen from the family of the organic peroxides. Preferably, the peroxide is an organic peroxide chosen from the group comprising or consisting of dicumyl peroxide, aryl or diaryl peroxides, diacetyl peroxide, benzoyl peroxide, dibenzoyl peroxide, di(tert-butyl) peroxide, tert-butyl cumyl peroxide, 2,5-bis(tert-butylperoxy)-2,5-dimethylhexane and their mixtures.

Various packaged products, known under their trade names, are available commercially; mention may be made of Dicup from Hercules Powder Co., Perkadox Y12 from Noury van der Lande, Peroximon F40 from Montecatini Edison S.p.A., Trigonox from Noury van der Lande, Varox from R.T.Vanderbilt Co. or else Luperko from Wallace & Tiernan Inc.

Preferably, the amount of peroxide to be used for the requirements of the invention is less than or equal to 3 phr. Preferably, the amount of peroxide in the composition is within a range extending from 0.1 to 3 phr. More preferably, the amount of peroxide in the composition is within a range extending from 0.2 to 2.5 phr, preferably from 0.25 to 1.8 phr.

The crosslinking system is preferably a vulcanization system based on molecular sulfur (and/or on a sulfur-donating agent). Very advantageously, the vulcanization system is accompanied by a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as described subsequently.

Particularly advantageously, the composition according to the invention comprises a vulcanization system based on molecular sulfur and/or on sulfur donors, and an anti-reversion agent.

The sulfur is used at a preferred content of between 1 and 10 phr, preferably between 1 and 5 phr and more preferably between 1 and 3 phr. The primary vulcanization accelerator can be used at a preferred content of between 0.2 and 5 phr, more preferably of between 0.5 and 3 phr.

Use may be made, as (primary or secondary) accelerator, of any compound capable of acting as accelerator of the vulcanization of diene elastomers in the presence of sulfur, in particular accelerators of the thiazole type and also their derivatives, or accelerators of thiuram or zinc dithiocarbamate types. These accelerators are, for example, selected from the group consisting of 2-mercaptobenzothiazyl disulfide (abbreviated to "MBTS"), tetrabenzylthiuram disulfide ("TBZTD"), N-cyclohexyl-2-benzothiazolesulfenamide ("CBS"), N,N-dicyclohexyl-2-benzothiazolesulfenamide ("DCBS"), N-(tert-butyl)-2-benzothiazolesulfenamide ("TBBS"), N-(tert-butyl)-2-benzothiazolesulfenimide ("TBSI"), zinc dibenzyldithiocarbamate ("ZBEC") and the mixtures of these compounds.

II-4 Anti-Reversion Agent

When the crosslinking system of the composition according to the invention is a vulcanization system based on sulfur and/or on a sulfur-donating agent, the composition according to the invention very preferably additionally comprises an anti-reversion agent well known to a person skilled in the art for its abilities to limit, indeed even to eliminate, the destruction or the shortening of the polysulfide crosslinking bridges. In other words, when the crosslinking system is not a vulcanization system (for example when the crosslinking system is based on peroxide), the presence of the anti-reversion agent is not compulsory.

The anti-reversion agent can be any anti-reversion agent known to a person skilled in the art. It can, for example, be a thiouronium salt or an analogue of this salt described in the document WO 2003/106195 or else a bismaleimide compound described in the document EP 0 823 453.

Advantageously, the anti-reversion agent is a citraconimide derivative of formula(I):

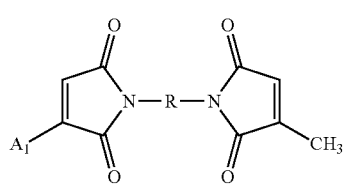

(I)

in which:
R is a hydrocarbon radical comprising from 1 to 25 carbon atoms and optionally one or more heteroatoms selected from the group consisting of O, N and S, and
$A_1$ represents a hydrogen atom or a methyl group.

Preferably, R is chosen from the group consisting of alkylenes having from 1 to 20 carbon atoms, cycloalkylenes having from 6 to 24 carbon atoms, arylenes having from 6 to 18 carbon atoms and aralkylenes having from 7 to 25 carbon atoms. For example, R can be selected from the group consisting of alkylenes having from 1 to 15, preferably from 1 to 10, carbon atoms, cycloalkylenes having from 6 to 20, preferably from 6 to 15, carbon atoms, arylenes having from 6 to 15, preferably from 6 to 10, carbon atoms, and aralkylenes having from 7 to 20, preferably from 7 to 15, carbon atoms. Particularly advantageously, R is an arylene having from 6 to 15, preferably from 6 to 10, carbon atoms.

Preferably, $A_1$ is a methyl group. In this case, the anti-reversion agent can advantageously be selected from the group consisting of 1,3-bis(citraconimidomethyl)benzene, 1,3-bis(citraconimidomethyl)-2-methyl benzene, 1,3-bis(citraconimidomethyl)-4-methylbenzene, 1,3-bis(citraconimidomethyl)-3-methylbenzene, 1,3-bis(citraconimidomethyl)-2,4-dimethyl benzene, 1,3-bis(citraconimidomethyl)-2-methylhexane, 1,3-bis(citraconimidomethyl)dodecane, 1,3-bis(citraconimidomethyl)decane, 1,3-bis(citraconimidomethyl)octane, 1,3-bis(citraconimidomethyl)hexane, 1,3-bis(citraconimidomethyl)pentane, and the mixtures of these compounds. More preferably, the anti-reversion agent is 1,3-bis(citraconimidomethyl)benzene. This compound corresponds to the following specific formula:

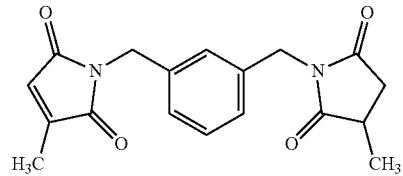 [SMILES: CC1=CC(=O)N(Cc2cccc(CN3C(=O)CC(C)C3=O)c2)C1=O]

This compound is available commercially under the name "Perkalink 900" (or DP900) from Lanxess.

$A_1$ can also be a hydrogen atom. In this case, the anti-reversion agent can, for example, be selected from the group consisting of N-(citraconimido-m-phenyl)maleimide, N-(citraconimido-p-phenyl)maleimide, N-(citraconimido-o-phenyl)maleimide, N-(3-citraconimido-4,6-dimethylphenyl)maleimide, N-(3-citraconimido-4-methylphenyl)maleimide, N-(3-citraconimido-6-methylphenyl)maleimide, N-(3-citraconimido-2-methylphenyl)maleimide, N-(1'-citraconimido-4,4'-methylenebiphenyl)maleimide, N-[2-(methylenecitraconimido)phenyl]methylenemaleimide, N-[3-(methylenecitraconimido)phenyl]methylenemaleimide, N-[4-(methylenecitraconimido)phenyl]methylenemaleimide, and the mixtures of these compounds.

The anti-reversion agent can also be a hexamethylene-1,6-bisthiosulfate salt. It can, for example, be a hexamethylene-1,6-bisthiosulfate salt selected from the group consisting of sodium hexamethylene-1,6-bisthiosulfate, potassium hexamethylene-1,6-bisthiosulfate, calcium hexamethylene-1,6-bisthiosulfate and their mixtures.

Such compounds are commercially available, for example sodium hexamethylene-1,6-bisthiosulfate, HTSNa, from Flexsys.

When the anti-reversion agent is used, the content of anti-reversion agent is within a range extending from 0.5 to 3 phr, preferably from 0.5 to 2.5 phr, more preferably from 1 to 2 phr.

II-5 Various Additives The rubber composition according to the invention can also comprise all or a portion of the usual additives generally used in the elastomer compositions for tyres, such as, for example, plasticizers or extending oils, whether the latter are aromatic or non-aromatic in nature, in particular very weakly aromatic or non-aromatic oils (e.g., paraffinic oils, hydrogenated naphthenic oils, MES oils or TDAE oils), vegetable oils, ether plasticizers, ester plasticizers (for example glycerol trioleates), fillers other than those mentioned above, for example lamellar fillers, plasticizing hydrocarbon resins exhibiting a high Tg, preferably of greater than 30° C., such as described, for example, in Applications WO 2005/087859, WO 2006/061064 and WO 2007/017060, pigments, protective agents, such as antiozone waxes, chemical antiozonants or antioxidants, anti-fatigue agents, reinforcing resins (such as resorcinol), methylene acceptors (for example phenolic novolak resin) or methylene donors (for example HMT or H3M), such as described, for example, in Application WO 02/10269.

II-6 Finished or Semi-Finished Rubber Article and Tyre

Another subject-matter of the present invention is a finished or semi-finished rubber article comprising a composition according to the invention.

The finished or semi-finished rubber article can, for example, be an internal layer of a tyre. According to the invention, the internal layer can be selected from the group consisting of carcass plies, crown plies, bead-wire fillings, crown feet, decoupling layers, edge rubbers, the tread underlayer and the combinations of these internal layers. Preferably, the internal layer is selected from the group consisting of carcass plies, crown plies, bead-wire fillings, crown feet, decoupling layers and the combinations of these internal layers.

According to the invention, the finished or semi-finished rubber article can comprise several reinforcing elements embedded in the rubber composition according to the invention, the reinforcing elements being arranged side by side along a main direction. The finished or semi-finished rubber article can, for example, be a carcass ply or a crown ply, preferably a carcass ply.

Another subject-matter of the present invention is a tyre which comprises a composition according to the invention or a finished or semi-finished rubber article according to the invention.

The present invention can be applied to any type of tyre. The tyre according to the invention can be intended to equip motor vehicles of passenger vehicle type, SUVs ("Sport Utility Vehicles"), or two-wheel vehicles (in particular motorcycles), or aircraft, or also industrial vehicles chosen from vans, heavy-duty vehicles—that is to say, underground trains, buses, heavy road transport vehicles (lorries, tractors, trailers) or off-road vehicles, such as heavy agricultural vehicles or civil engineering vehicles—, and others. However, the composition according to the invention is particularly well suited to large-sized tyres. Thus, advantageously, the tyre according to the invention is a tyre for agricultural vehicles.

II-7 Preparation of the Rubber Compositions

For the compositions comprising a vulcanization system, the compositions can be manufactured in appropriate mixers, using two successive phases of preparation which are well known to a person skilled in the art: a first phase of thermomechanical working or kneading (sometimes described as "non-productive" phase) at high temperature, up to a maximum temperature of between 110° C. and 190° C., preferably between 130° C. and 180° C., followed by a second phase of mechanical working (sometimes described as "productive" phase) at a lower temperature, typically of less than 110° C., for example between 60° C. and 100° C., during which finishing phase the vulcanization system is incorporated; such phases have been described, for example, in Applications EP-A-0 501 227, EP-A-0 735 088, EP-A-0 810 258, WO00/05300 or WO00/05301.

The first (non-productive) phase is preferably carried out in several thermomechanical stages. During a first stage, the elastomers, the reinforcing fillers and the combination of plasticizers (and optionally the coupling agents and/or other ingredients, with the exception of the vulcanization system) are introduced into an appropriate mixer, such as an ordinary internal mixer, at a temperature of between 20° C. and 100° C. and preferably between 25° C. and 100° C. After a few minutes, preferably from 0.5 to 2 min, and a rise in the temperature to 90° C. to 100° C., the other ingredients (that is to say, those which remain, if not all were put in at the start) are added all at once or in portions, with the exception of the vulcanization system, during a mixing ranging from 20 seconds to a few minutes. The total duration of the kneading, in this non-productive phase, is preferably between 2 and 10 minutes at a temperature of less than or equal to 180° C. and preferentially of less than or equal to 170° C.

After cooling the mixture thus obtained, the vulcanization system is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or of a plaque, in particular for laboratory characterization, or also extruded, in order to form, for example, a rubber profiled element used in the manufacture of semi-finished products, in order to obtain products such as an internal layer or a tread, for example. These products can subsequently be used in the manufacture of tyres, according to techniques known to a person skilled in the art.

The vulcanization (or curing) is carried out in a known way at a temperature generally of between 130° C. and 200° C., under pressure, for a sufficient time which can vary, for example, between 5 and 90 min, as a function in particular of the curing temperature, of the vulcanization system adopted, of the kinetics of vulcanization of the composition under consideration or else of the size of the tyre.

For the compositions comprising a peroxide crosslinking system, a person skilled in an art knows how to adjust the stages of the above process, in particular compounding temperature.

III—EXAMPLES

III-1 Measurements and Tests Used

Tensile Tests

These tests were carried out in accordance with French Standard NF T 46-002 of September 1988. All the tensile measurements were carried out under the standard conditions of temperature (23±2° C.) and hygrometry (50%±5% relative humidity), according to French Standard NF T 40-101 (December 1979).

At second elongation (that is to say, after accommodation), the nominal secant modulus, calculated by reducing to the initial cross section of the test specimen, (or apparent stress, in MPa) was measured at 10% and 100% elongation, denoted MAS10 and MAS100 respectively, on samples cured at 150° C. for 25 minutes or at 160° C. for 90 minutes.

The results are expressed in base 100, the value 100 being assigned to the control. A result of greater than 100 indicates that the composition of the example under consideration exhibits a greater stiffness.

The breaking stresses (in MPa) and the elongations at break (EB in %), at 23° C.±2° C., were also measured according to Standard NF T 46-002 on raw samples or on samples cured at 150° C. for 25 minutes or at 160° C. for 90 minutes. The breaking energy is equal to the product of the elongation at break by the breaking stress.

Near-Infrared (NIR) Spectroscopy

The microstructure of the elastomers is characterized by the near-infrared (NIR) spectroscopy technique. Near-infrared spectroscopy (NIR) is used to quantitatively determine the content by weight of styrene in the elastomer and also its microstructure (relative distribution of the 1,2-, trans-1,4- and cis-1,4-butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] carried out using standard elastomers having a composition determined by $^{13}$C NMR. The styrene content and the microstructure are then calculated from the NIR spectrum of an elastomer film having a thickness of approximately 730 μm. The spectrum is acquired in transmission mode between 4000 and 6200 cm$^{-1}$ with a resolution of 2 cm$^{-1}$ using a Bruker Tensor 37 Fourier-transform near-infrared spectrometer equipped with an InGaAs detector cooled by the Peltier effect.

III-2 Preparation of the Compositions

The tests which follow are carried out in the following way: the diene elastomer, the reinforcing filler and also the various other ingredients, including the anti-reversion agent, with the exception of the vulcanization system, are successively introduced into a blade mixer (final degree of filling: approximately 70% by volume), the initial vessel temperature of which is approximately 90° C. Thermomechanical working (non-productive phase) is then carried out in one stage, which lasts in total approximately from 3 to 4 min, until a maximum "dropping" temperature of 165° C. is reached.

The mixture thus obtained is recovered and cooled and then sulfur and the accelerator of sulfenamide type are incorporated on a mixer (homofinisher) at 40° C., everything being mixed (productive phase) in an open mill for an appropriate time (for example between 5 and 12 min).

The compositions thus obtained are subsequently calendered, either in the form of plaques (thickness of 2 to 3 mm) or of thin sheets of rubber, for the measurement of their physical or mechanical properties, or extruded in the form of a profiled element.

A portion of the samples was analysed in the raw state. Other samples were cured at 150° C. for 25 minutes or at 160° C. for 90 minutes in a bell press and were analysed after having been cooled at ambient temperature for 24 hours.

III-3 Rubber Test

The object of the examples presented in Table 1 is to compare the different properties of compositions in accordance with the invention (I1 and I2) with control compositions (C1 to C6). The controls C1, C2 and C3 differ from the compositions in accordance with the present invention in the nature of the butadiene/styrene copolymer used. The controls C4, C5 and C6 differ from the compositions in accordance with the present invention in the nature of the carbon black used. The results are expressed in bases 100 with respect to the control C1.

TABLE 1

| | C1 | C2 | C3 | C4 | C5 | C6 | I1 | I2 |
|---|---|---|---|---|---|---|---|---|
| Natural rubber | 40 | 40 | 40 | 40 | 40 | 40 | 40 | 40 |
| SBR 1 (a) | 60 | | | | | | | |
| SBR 2 (b) | | 60 | | | | | | |
| SBR 3 (c) | | | 60 | | | | | |
| SBR 4 (d) | | | | 60 | 60 | 60 | 60 | 60 |
| N550 (e) | | | | 50 | | | | |
| N134 (f) | | | | | 50 | | | |
| N234 (g) | | | | | | 50 | | |
| N375 (h) | 50 | 50 | 50 | | | | 50 | 50 |
| Anti-reversion agent 1 (i) | 1 | 1 | 1 | 1 | 1 | 1 | 1 | |
| Anti-reversion agent 2 (j) | | | | | | | | 1 |
| Liquid plasticizer (k) | 2 | 2 | 2 | 2 | 2 | 2 | 2 | 2 |
| Tackifying resin (l) | 5 | 5 | 5 | 5 | 5 | 5 | 5 | 5 |
| Zinc oxide | 3 | 3 | 3 | 3 | 3 | 3 | 3 | 3 |
| Stearic acid (m) | 1.5 | 1.5 | 1.5 | 1.5 | 1.5 | 1.5 | 1.5 | 1.5 |
| 6PPD (n) | 1.5 | 1.5 | 1.5 | 1.5 | 1.5 | 1.5 | 1.5 | 1.5 |
| TMQ (o) | 1 | 1 | 1 | 1 | 1 | 1 | 1 | 1 |
| Sulfur | 2 | 2 | 2 | 2 | 2 | 2 | 2 | 2 |
| Sulfenamide (p) | 0.5 | 0.5 | 0.5 | 0.5 | 0.5 | 0.5 | 0.5 | 0.5 |
| Raw property | | | | | | | | |
| EB % at 23° C. | 100 | 105 | 85 | 100 | 120 | 100 | 180 | 120 |
| Breaking energy at 23° C. | 100 | 200 | 83 | 150 | 158 | 150 | 358 | 183 |
| Property after curing (25 minutes at 150° C.) | | | | | | | | |
| MAS10 at 23° C. (in MPa) | 100 | 100 | 100 | 106 | 67 | 89 | 111 | 111 |
| MAS100 at 23° C. (in MPa) | 100 | 125 | 106 | 113 | 75 | 106 | 125 | 125 |
| EB % at 100° C. | 100 | 90 | 100 | 90 | 90 | 90 | 130 | 120 |
| BS at 100° C. (MPa) | 100 | 100 | 95 | 95 | 100 | 95 | 137 | 116 |
| Property after curing (90 minutes at 160° C.) | | | | | | | | |
| MAS10 at 23° C. (in MPa) | 100 | 94 | 100 | 100 | 89 | 94 | 111 | 111 |
| MAS100 at 23° C. (in MPa) | 100 | 100 | 100 | 100 | 94 | 112 | 118 | 118 |

TABLE 1-continued

|  | C1 | C2 | C3 | C4 | C5 | C6 | I1 | I2 |
|---|---|---|---|---|---|---|---|---|
| EB % at 100° C. | 100 | 95 | 95 | 90 | 90 | 90 | 130 | 110 |
| BS at 100° C. (MPa) | 100 | 95 | 95 | 95 | 95 | 95 | 147 | 111 |

(a): SBR 1: Emulsion SBR of Tg −48° C., % Styrene 23.5, % Vinyl 18, % Trans 71
(b): SBR 2: Solution SBR of Tg −27° C., % Styrene 26.5, % Vinyl 58, % Trans 23
(c): SBR 3: Solution SBR of Tg −65° C., % Styrene 15.5, % Vinyl 24, % Trans 47
(d): SBR 4: Solution SBR of Tg −54° C., % Styrene 27, % Vinyl 6, % Trans 78
(e): Carbon black N550 (according to Standard ASTM D-1765) of BET 39 $m^2$/g and COAN 85 ml/100 g
(f): Carbon black N134 (according to Standard ASTM D-1765) of BET 140 $m^2$/g and COAN 100 ml/100 g
(g): Carbon black N234 (according to Standard ASTM D-1765) of BET 120 $m^2$/g and COAN 100 ml/100 g
(h): Carbon black N375 (according to Standard ASTM D-1765) of BET 95 $m^2$/g and COAN 95 ml/100 g
(i): Anti-reversion agent 1: 1,3-bis(citraconimidomethyl)benzene, DP900 from Lanxess
(j): Anti-reversion agent 2: sodium hexamethylene-1,6-bisthiosulfate, HTSNa from Flexsys
(k): MES oil from Exxon Mobil
(l): Octylphenol/formaldehyde resin from BASF
(m): Stearin, Pristerene 4931 from Uniqema
(n): N-(1,3-Dimethylbutyl)-N'-phenyl-para-phenylenediamine, Santoflex 6-PPD from Flexsys
(o): 2,2,4-Trimethyl-1,2-dihydroquinoline (TMQ) from Lanxess
(p): N-(tert-Butyl)-2-benzothiazolesulfenamide, Santocure TBBS from Flexsys The results show that the compositions according to the invention make it possible to improve both the raw and cured properties and even to maintain these properties after overcuring. On the other hand, as soon as the nature of the butadiene/styrene copolymer and/or of the carbon black is modified, the properties of the mixture are degraded with respect to the compositions in accordance with the invention.

The invention claimed is:

1. A rubber composition based on at least:
an elastomeric matrix comprising at most 70 parts by weight per hundred parts by weight of elastomer, phr, of a polyisoprene and at least 30 phr of a butadiene/styrene copolymer,
wherein the butadiene/styrene copolymer exhibits a content of styrene units of between 20% and 40% by weight, with respect to the total weight of the butadiene/styrene copolymer, a content of trans-1,4-butadiene units of greater than 65% by weight, with respect to the total weight of the butadiene units, a content of vinyl units of less than 8% by weight, with respect to the total weight of the butadiene units, and a glass transition temperature of between −60° C. and −35° C.;
from 35 to 75 phr of a carbon black exhibiting a BET specific surface of between 90 and 100 $m^2$/g and a COAN absorption index of between 90 and 100 ml/100 g; and
a crosslinking system.

2. The rubber composition according to claim 1, wherein the polyisoprene is selected from the group consisting of natural rubber, a synthetic polyisoprene and mixtures thereof.

3. The rubber composition according to claim 1, wherein the butadiene/styrene copolymer exhibits a content of styrene units of between 20% and 30% by weight, with respect to the total weight of the butadiene/styrene copolymer.

4. The rubber composition according to claim 1, wherein the butadiene/styrene copolymer exhibits a content of trans-1,4-butadiene units of between 65% and 90% by weight, with respect to the total weight of the butadiene units.

5. The rubber composition according to claim 1, wherein the butadiene/styrene copolymer exhibits a content of vinyl units of between 2% and 8% by weight, with respect to the total weight of the butadiene units.

6. The rubber composition according to claim 1, wherein the butadiene/styrene copolymer exhibits a glass transition temperature of between −60° C. and −40° C.

7. The rubber composition according to claim 1, wherein the butadiene/styrene copolymer is a butadiene/styrene copolymer prepared in solution.

8. The rubber composition according to claim 1, wherein the elastomeric matrix comprises from 30 to 70 phr of the polyisoprene and from 30 to 70 phr of the butadiene/styrene copolymer.

9. The rubber composition according to claim 1, wherein the elastomeric matrix comprises from 30 to 50 phr of the polyisoprene and from 50 to 70 phr of the butadiene/styrene copolymer.

10. The rubber composition according to claim 1, wherein the content of carbon black is within a range extending from 40 to 70 phr.

11. The rubber composition according to claim 1, wherein the crosslinking system is a vulcanization system selected from the group consisting of systems based on molecular sulfur, on a sulfur-donating agent, on peroxide, and on a mixture thereof.

12. The rubber composition according to claim 11, wherein a sulfur content is within a range extending from 1 to 10 phr.

13. The rubber composition according to claim 1, wherein the crosslinking system is a vulcanization system comprising an anti-reversion agent and a system selected from the group consisting of systems based on molecular sulfur, on a sulfur donor, and on a mixture thereof.

14. The rubber composition according to claim 13, wherein a content of anti-reversion agent is within a range extending from 0.5 to 3 phr.

15. The rubber composition according to claim 13, wherein the anti-reversion agent is a hexamethylene-1,6-bisthiosulfate salt.

16. The rubber composition according to claim 15, wherein the hexamethylene-1,6-bisthiosulfate salt is selected from the group consisting of sodium hexamethylene-1,6-bisthiosulfate, potassium hexamethylene-1,6-bisthiosulfate, calcium hexamethylene-1,6-bisthiosulfate and mixtures thereof.

17. The rubber composition according to claim 13, wherein the anti-reversion agent is a citraconimide derivative of formula (I):

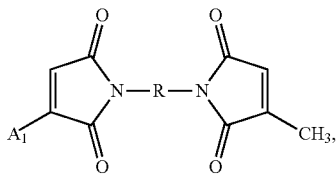

wherein R is a hydrocarbon radical comprising from 1 to 25 carbon atoms and optionally one or more heteroatoms selected from the group consisting of O, N and S, and wherein $A_1$ is a hydrogen atom or a methyl group.

18. The rubber composition according to claim 17, wherein R is selected from the group consisting of alkylenes having from 1 to 20 carbon atoms, cycloalkylenes having from 6 to 24 carbon atoms, arylenes having from 6 to 18 carbon atoms, and aralkylenes having from 7 to 25 carbon atoms.

19. The rubber composition according to claim 17, wherein $A_1$ is a methyl group.

20. The rubber composition according to claim 17, wherein the anti-reversion agent is selected from the group consisting of 1,3-bis(citraconimidomethyl)benzene, 1,3-bis(citraconimidomethyl)-2-methylbenzene, 1,3-bis(citraconimidomethyl)-4-methylbenzene, 1,3-bis(citraconimidomethyl)-3-methylbenzene, 1,3-bis(citraconimidomethyl)-2,4-dimethylbenzene, 1,3-bis(citraconimidomethyl)-2-methylhexane, 1,3-bis(citraconimidomethyl)dodecane, 1,3-bis(citraconimidomethyl)decane, 1,3-bis(citraconimidomethyl)octane, 1,3-bis(citraconimidomethyl)hexane, 1,3-bis(citraconimidomethyl)pentane, and mixtures thereof.

21. The rubber composition according to claim 17, wherein the anti-reversion agent is 1,3-bis(citraconimidomethyl)benzene.

22. The rubber composition according to claim 17, wherein $A_1$ is a hydrogen atom.

23. The rubber composition according to claim 17, wherein the anti-reversion agent is selected from the group consisting of N-(citraconimido-m-phenyl)maleimide, N-(citraconimido-p-phenyl)maleimide, N-(citraconimido-o-phenyl)maleimide, N-(3-citraconimido-4,6-dimethylphenyl)maleimide, N-(3-citraconimido-4-methylphenyl)maleimide, N-(3-citraconimido-6-methylphenyl)maleimide, N-(3-citraconimido-2-methylphenyl)maleimide, N-(1'-citraconimido-4,4'-methylenebiphenyl)maleimide, N-[2-(methylenecitraconimido)phenyl]methylenemaleimide, N-[3-(methylenecitraconimido)phenyl]methylenemaleimide, N-[4-(methylenecitraconimido)phenyl]methylenemaleimide, and mixtures thereof.

24. A finished or semi-finished rubber article comprising a rubber composition according to claim 1.

25. A tire comprising a rubber composition according to claim 1.

26. A tire comprising a finished or semi-finished rubber article according to claim 24.

* * * * *